(12) United States Patent
Peterson et al.

(10) Patent No.: US 9,010,665 B1
(45) Date of Patent: Apr. 21, 2015

(54) MANUALLY OPERATED COMPOST TOPDRESSER

(71) Applicant: Earth & Turf Products, LLC, New Holland, PA (US)

(72) Inventors: Tharen W. Peterson, Lancaster, PA (US); John A. Bentley, Manheim, PA (US)

(73) Assignee: Earth & Turf Products, LLC, New Holland, PA (US)

( * ) Notice: Subject to any disclaimer, the term of this patent is extended or adjusted under 35 U.S.C. 154(b) by 211 days.

(21) Appl. No.: 13/831,391

(22) Filed: Mar. 14, 2013

Related U.S. Application Data

(60) Provisional application No. 61/611,120, filed on Mar. 15, 2012.

(51) Int. Cl.
 *A01C 15/00* (2006.01)

(52) U.S. Cl.
 CPC .................................... *A01C 15/007* (2013.01)

(58) Field of Classification Search
 CPC .. A01C 23/027; A01C 23/042; A01C 15/007; A01C 19/04
 USPC ........................... 239/659, 650, 667, 683, 685
 See application file for complete search history.

(56) References Cited

U.S. PATENT DOCUMENTS

| | | | |
|---|---|---|---|
| 2,201,534 A * | 5/1940 | Hallenbeck | 404/103 |
| 2,233,432 A * | 3/1941 | Schramm | 209/139.1 |
| 3,071,382 A * | 1/1963 | De Biasi | 239/660 |
| 4,155,315 A | 5/1979 | Dobbins | |
| 4,634,056 A | 1/1987 | Precure | |
| 4,804,145 A | 2/1989 | Seymour | |
| 6,202,944 B1 | 3/2001 | McCrory | |
| 6,892,516 B1 | 5/2005 | Ardagna | |
| 7,337,992 B1 * | 3/2008 | Blatt | 239/654 |

* cited by examiner

*Primary Examiner* — Davis Hwu
(74) *Attorney, Agent, or Firm* — Miller Law Group, PLLC

(57) ABSTRACT

A manually operable push-type topdresser includes a reciprocating screen apparatus at the bottom of a material hopper that is operable to reduce the particulate material within the hopper to a uniform size before discharging the particulate material onto the surface of the ground. The topdresser includes a ground drive mechanism to power the reciprocation of an upper screen member when the topdresser is moved. The drive mechanism includes a front drive wheel mounted on one end of an axle and a freely rotatable wheel mounted on the opposing end of the axle to facilitate maneuverability of the topdresser in tight spaces. The reciprocation of the upper screen prevents bridging of the particulate material within the hopper. A control linkage shifts the ground drive mechanism between operable and inoperable modes by moving a shift collar to control engagement of the reciprocation drive with a cam member rotatable with the drive wheel.

19 Claims, 8 Drawing Sheets

MANUALLY OPERATED COMPOST TOPDRESSER

CROSS-REFERENCE TO RELATED APPLICATIONS

This application claims domestic priority on U.S. Provisional Patent Application Ser. No. 61/611,120, filed on Mar. 15, 2012, the content of which is incorporated herein by reference.

FIELD OF THE INVENTION

The present invention generally relates to an apparatus for distributing granular material, such as sand, top soil, fertilizers, compost and other soil additives over the surface of the ground, including top dressing to the surface of turf-covered ground, and, more particularly, to a topdresser that utilizes a pair of screens arranged in a reciprocating manner to distribute the material within the hopper to the surface of the ground.

BACKGROUND OF THE INVENTION

Compost is generally defined as any organic material that has undergone a biodegradation process. Typical examples of compost are decomposed leaves, sewage sludge which has been mixed with wood chips or other material to allow air to permeate the sludge, and mushroom soil. Compost is usually applied to golf courses, lawns and park grounds as a thin even top dressing. In the past, the proper application of compost has required the use of small material spreading machines. Whether of the pull type or self propelled, material spreading machines are commonly used for applying dressings to turf-covered ground, such as ground surfaces used for various athletic activities, and especially football fields and golf courses. Such material spreading machines commonly include a hopper and a moving belt which passes within or beneath the hopper to convey the material to a distribution mechanism, such as a rotating brush, that dispenses the material onto the surface of the ground.

Typically, compost material spreading machines are equipped with a rotating brush distributing apparatus, which is usually mounted at the rear of a moving belt that carries the compost to the rotating brush distributor. One of the large material spreading machines is found in U.S. Pat. No. 4,804, 145, granted to Shaun A. Seymour on Feb. 14, 1989, in which the hopper is a substantially rectangular spreader box with a rotating brush at the discharge end of the spreader box to distribute the compost onto the top surface of the ground. A similar apparatus is disclosed in U.S. Pat. No. 6,202,944, granted to Kevin McCrory on Mar. 20, 2001, wherein the hopper meters the flow of compost into a thin layer to be presented to the rotating brush distributor that dispenses the compost onto the top surface of the ground.

In some material spreading machines, such as is depicted in U.S. Pat. No. 4,634,056, issued on Jan. 6, 1987, to Carroll Precure, the compost is distributed directly by the endless belt extracting the compost from within the hopper. In U.S. Pat. No. 4,155,315, issued to John Dobbins on May 22, 1979, the compost is distributed directly from the hopper onto the top surface of the ground, the rate of application of the material from the hopper being controlled by a slidable plate positionable across the opening in the hopper through which the material flows. A ground-engaging roller supported on the frame of the Dobbins material spreading machine provides sufficient vibration to the compost within the hopper to prevent the material from bridging over the discharge opening. A rotary screening device is disclosed in U.S. Pat. No. 6,892, 516, granted on May 17, 2005, to Salvatore Ardagna, by which material, including compost, can be sifted and separated for appropriate application subsequently to the separation action of the apparatus.

All of these known compost material spreading machines are particularly adapted for utilization on athletic fields and golf courses, as the machines carry large quantities of compost for topdressing large areas of turf-covered ground. None of these known material spreading machines are particularly well adapted for use in small locations, such as a residential yard, in which maneuverability is needed and manual control over the distribution of the compost material over the ground. One of the problems with spreading compost is that compost is not uniformly sized. The variably sized compost particles will not go through a small lawn push spinner spreader or through a small lawn push drop spreader. A V-shaped hopper with a roller at the bottom of the hopper will accommodate the varying particle size, but is only effective if the compost material is dry. Compost material that has moisture will have a tendency to clump and bridge over the opening at the bottom of the V-shaped hopper. Thus, commonly used fertilizer spinner and drop spreaders typically used on small residential lawns, are not effectively operable to provide a topdressing of compost over turf-covered ground.

Accordingly, it would be desirable to provide a manually operable push-type configuration of compost spreading machine that can be used in small locations for the application of limited quantities of compost or other granular soil additive materials to the top surface of turf-covered ground.

SUMMARY OF THE INVENTION

It is an object of this invention to provide a manually operable push-type topdresser for spreading compost or other particulate material over the surface of the ground in an even, thinly applied layer.

It is another object of this invention to provide a reciprocating apparatus within the hopper of the topdresser to reduce the particulate material being discharged to a uniform size that facilitates the formation of a thinly applied, even layer of particulate material on the surface of the ground.

It is a feature of this invention that the reciprocating apparatus is formed as a pair of vertically spaced screens positioned at the bottom of the material hopper, at least one of the screens being reciprocal relative to the other screen.

It is another feature of this invention that the upper screen is connected to a drive apparatus to cause reciprocation thereof as the topdresser is moved along the surface of the ground.

It is still another feature of this invention that the lower screen is stationary relative to the hopper so that the upper screen reciprocates over the lower screen.

It is an advantage of this invention that the particulate material, such as compost, is reduced to a uniform size as the material is being discharged from the hopper onto the surface of the ground.

It is another advantage of this invention that the upper reciprocating and lower fixed screens create a sifting action that breaks up the variably sized compost particles to allow the compost particles to drop through the two screens onto the surface of the ground below the hopper.

It is another advantage of this invention that the configuration of the push-type topdresser is maneuverable to accommodate utilization within tight confines of a residential yard.

It is yet another feature of this invention that the flow of the particulate material for discharge from the hopper is manually controlled.

It is still another advantage of this invention that the manual control of the flow of material from the hopper of the topdresser facilitates the application of particulate material in small locations, such as a residential yard.

It is yet another advantage that the operation of the manually operable, push-type topdresser is less dependent of the moisture content of the compost being applied from the topdresser.

It is another feature of this invention that the material hopper is not provided with a roller to meter flow of particulate material to a distribution device for applying the particulate material to the surface of the ground.

It is still another feature of this invention that the configuration of the manually operable push-type topdresser is sized to permit manual operation of the topdresser even when the particulate material being distributed includes a high moisture content.

It is still another object of this invention to provide a ground drive mechanism that selectively powers the reciprocation of the upper screen when the topdresser is moved over the surface of the ground.

It is a further feature of this invention that the drive mechanism includes a front wheel axle connected to a drive wheel and having a freely rotatable wheel mounted thereon.

It is a further advantage of this invention that the freely rotatable wheel facilitates the manipulation of the topdresser is small, tight locations.

It is still a further feature of this invention that the drive wheel is operably connected to a rocker mechanism that powers the fore-and-aft reciprocation of the upper screen.

It is yet a further feature of this invention that the rocker mechanism includes a lobed cam member that is rotatable with the drive wheel and a laterally shiftable device that moves the reciprocating drive into and out of engagement with the cam member.

It is still a further advantage of this invention that the reciprocation drive mechanism is selectively engagable to operate the reciprocation of the upper screen.

It is yet another advantage of this invention that the reciprocating motion of the drive mechanism and the reciprocating upper screen creates sufficient vibration that prevents compost material from bridging within the hopper.

It is yet another object of this invention to provide a manually operable push-type topdresser for spreading compost or other particulate material that is durable in construction, inexpensive of manufacture, carefree of maintenance, facile in assemblage, and simple and effective in use.

These and other objects, features and advantages are accomplished according to the instant invention by providing a manually operable push-type topdresser having a hopper for carrying a supply of particulate material and a reciprocating screen apparatus that is operable to reduce the particulate material to a uniform size and to discharge the particulate material onto the surface of the ground. The topdresser includes a ground drive mechanism to power the reciprocation of the upper screen member when the topdresser is moved along the ground. The drive mechanism includes a front drive wheel mounted on one end of an axle and a freely rotatable wheel mounted on the opposing end of the axle to facilitate maneuverability of the topdresser in tight spaces. The reciprocation of the upper screen prevents bridging of the particulate material within the hopper. A control linkage shifts the ground drive mechanism between operable and inoperable modes by moving a shift collar to control engagement of the reciprocation drive with a cam member rotatable with the drive wheel.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
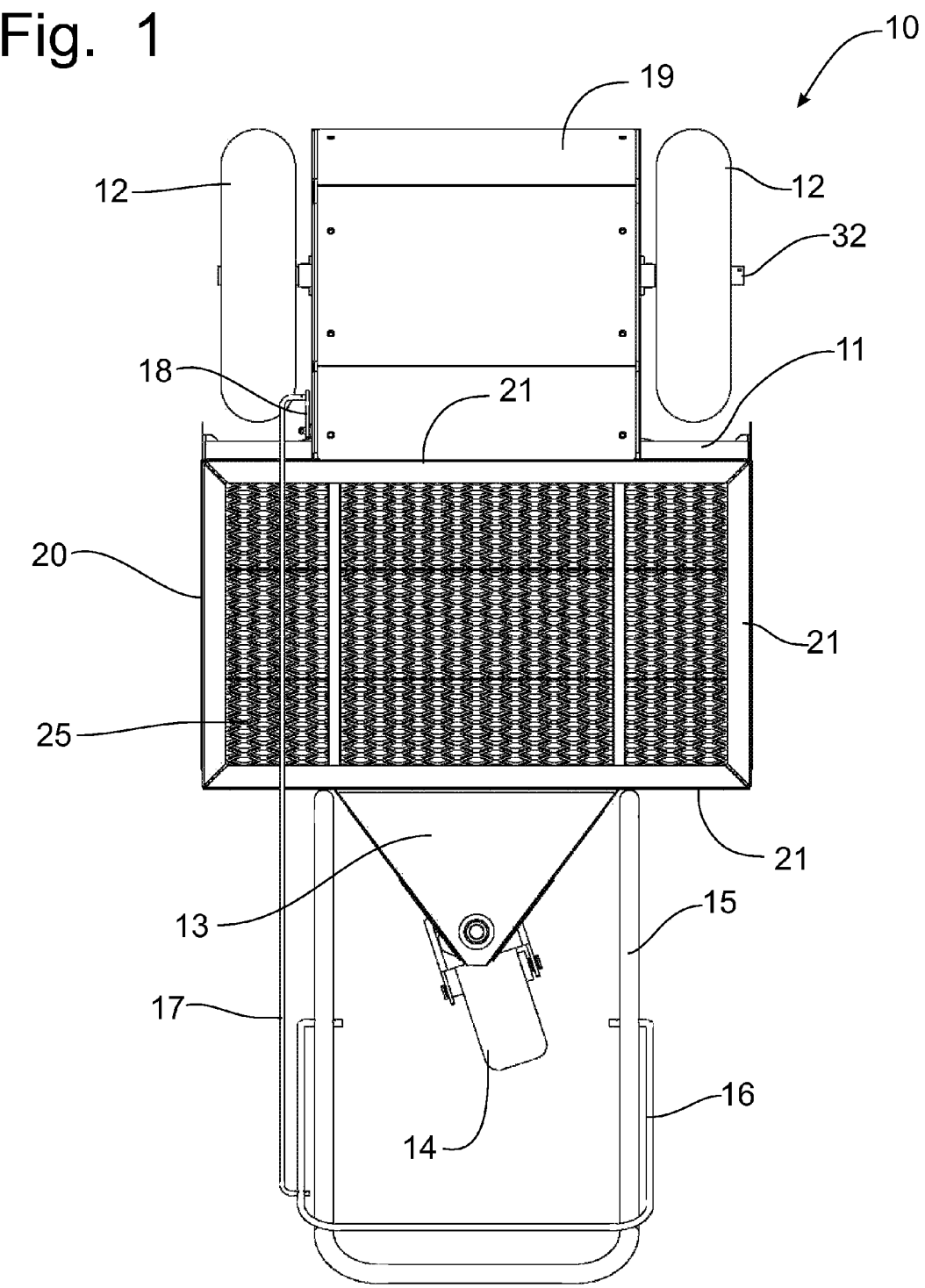
FIG. 1 is a top plan view of the push-type compost spreading apparatus incorporating the principles of the instant invention.

Referring to FIGS. 1-7, a compost spreading apparatus incorporating the principles of the instant invention can best be seen. Left, right, front and rear references are use as a matter of convenience and are determined by standing at the rear of the apparatus 10 where the push handle assembly 15 is located and facing the push handle assembly 15 to push the apparatus 10 along a forward direction of operative travel. The compost spreading apparatus 10 has a frame 11 supporting a forward pair of ground-engaging drive wheels 12 and a rearward caster wheel 14 that provide mobility for the apparatus 10 over the surface of the ground. The push handle assembly 15 extends rearwardly from the frame 11 to provide the ability to move and direct the movement of the apparatus 10, as will be described in greater detail below.

The rearward portion of the frame 11 is formed with a triangular caster wheel mount 13 that extends rearwardly from the hopper 20 and terminates in an apex where the caster wheel 14 is pivotally supported. The push handle assembly 15 is affixed to the triangular caster wheel mount 13 so that the operator can push on the handle 15 to move the apparatus 10 in a forward direction, or pull the handle 15 to move the apparatus 10 rearwardly, as well as push the handle 15 sideways to turn the apparatus 10, while the caster wheel 14 allows the turning movement. Pivotally mounted on the push handle 15 is a drive actuator lever 16 that is operable to initiate the ground drive mechanism, as will be described in greater detail below.

The hopper 20, best seen in FIGS. 1, 2 6 and 7, is formed with vertical walls 21 at the front, back and sides to define a cavity that will contain a supply of compost that is not too heavy, even if containing moisture, that would prevent a single person from moving the apparatus 10 when fully loaded with compost. The hopper 20 is formed with a first stationary screen member 23 fixed to the bottoms of the vertical walls 21 and a second movable screen 25 mounted on top of the first stationary screen 23 for fore-and-aft reciprocal movement over top of the stationary screen 23. A pair of guide members 26 located at the forward and rearward ends of the hopper 20 restrain and guide the movement of the movable screen 25 within the hopper 20 over top of the stationary screen 23. The movement of the movable screen 25 creates a sifting action that breaks up the variably sized compost particles to allow the compost particles to drop through the two screens 23, 25 onto the surface of the ground below the hopper 20.

Figure 8:
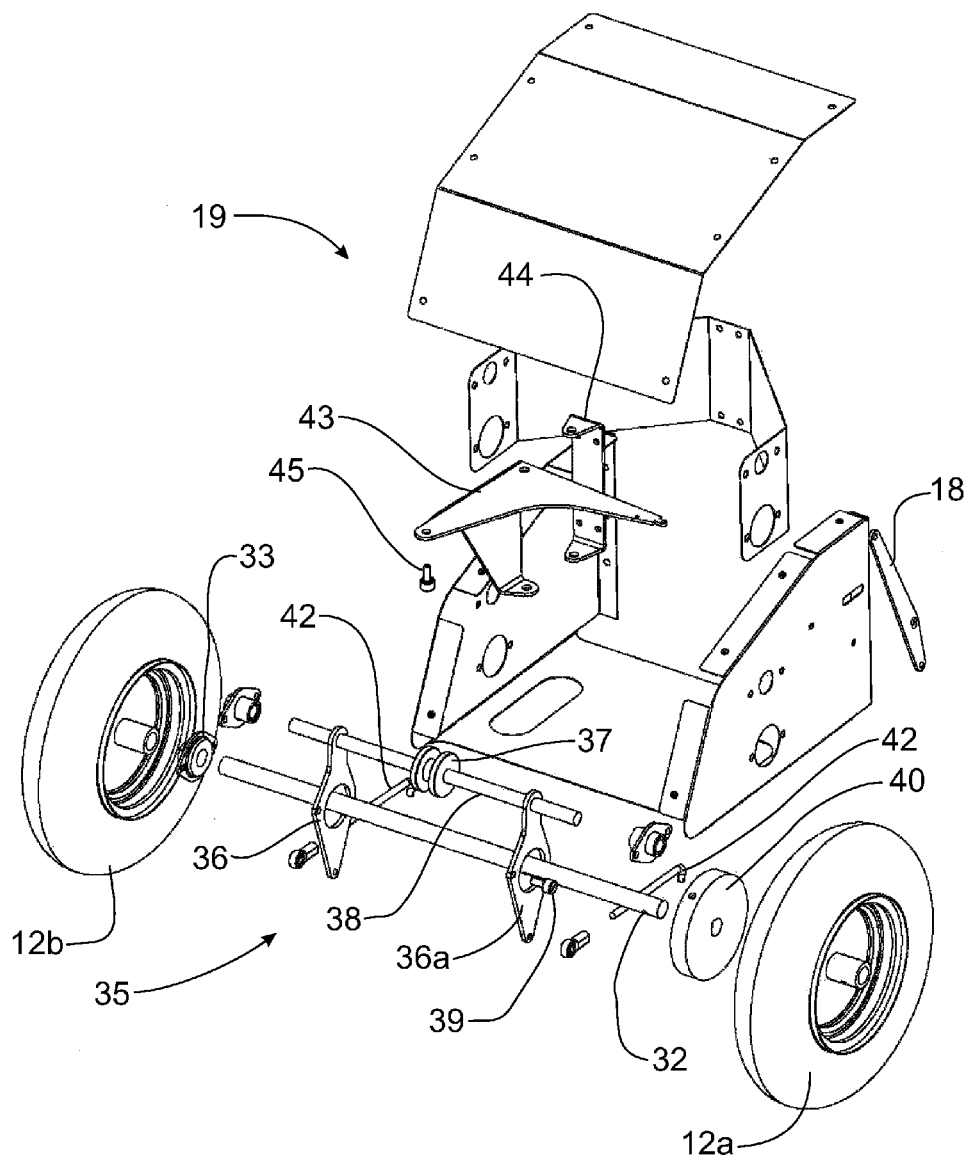
FIG. 8 is an exploded view of the ground drive mechanism for reciprocating one of the screens of the dual screen distribution mechanism shown in FIG. 7.

The forward portion of the frame 11 includes a drive housing 19 encompassing the front drive axle 32 extending between the front wheels 12. As best seen in FIG. 8, the front axle 32 is attached to one of the front wheels 12a through a fastener (not shown) that secures the front axle 32 to the front drive wheel 12a so as to be rotatable with the driving front wheel 12a. The opposing front wheel 12b is supported in a bearing 33 that allows the wheel 12b to freely turn on the front axle 32. One skilled in the art will recognize that the ground drive mechanism 30 does not need to be secured to both front wheels 12, as the freely rotatable opposing wheel 12b facilitates the turning of the apparatus 10 when the operator pushes sideways on the push handle assembly 15.

The drive mechanism 30 includes a rocker shaft weld assembly 35 formed with a pair of transversely spaced, star-shaped rocker members 36 centered over the axle 32 with a shift collar 37 mounted on a transverse rod 38 interconnecting the rocker members 36. The rocker member 36a closest to the drive front wheel 12a has a cam follower 39 mounted thereon. The cam follower 39 is engagable with a cam member 40 fixed on the axle 32 so as to be rotatable therewith. The cam member 40 is preferably formed with a machined groove therein that establishes a path for the cam follower 39 to engage and follow in a conventional manner to oscillate the rocker member 36 on which the cam follower 39 is affixed. As is best seen in FIG. 8, each of the rocker members 36 is formed with an elongated central opening through which the front axle 32 passes. The elongated central opening on the rocker members 36 enables the rocker members 36 to shift forwardly and rearwardly as the cam follower 39 rolls along the machined groove in the cam member 40.

Figure 2:
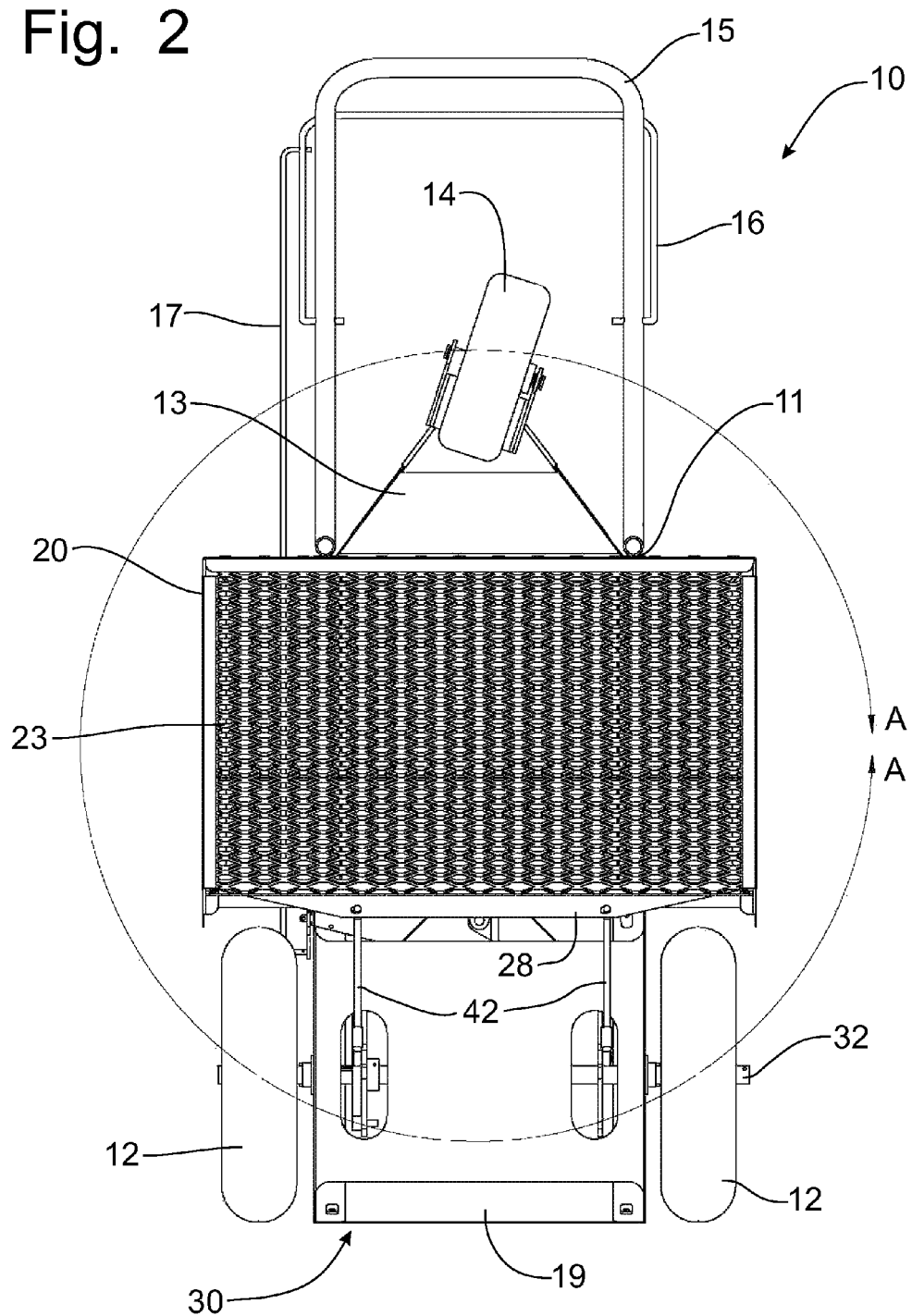
FIG. 2 is a bottom plan view of the push-type compost spreading apparatus shown in FIG. 1.
Figure 3:
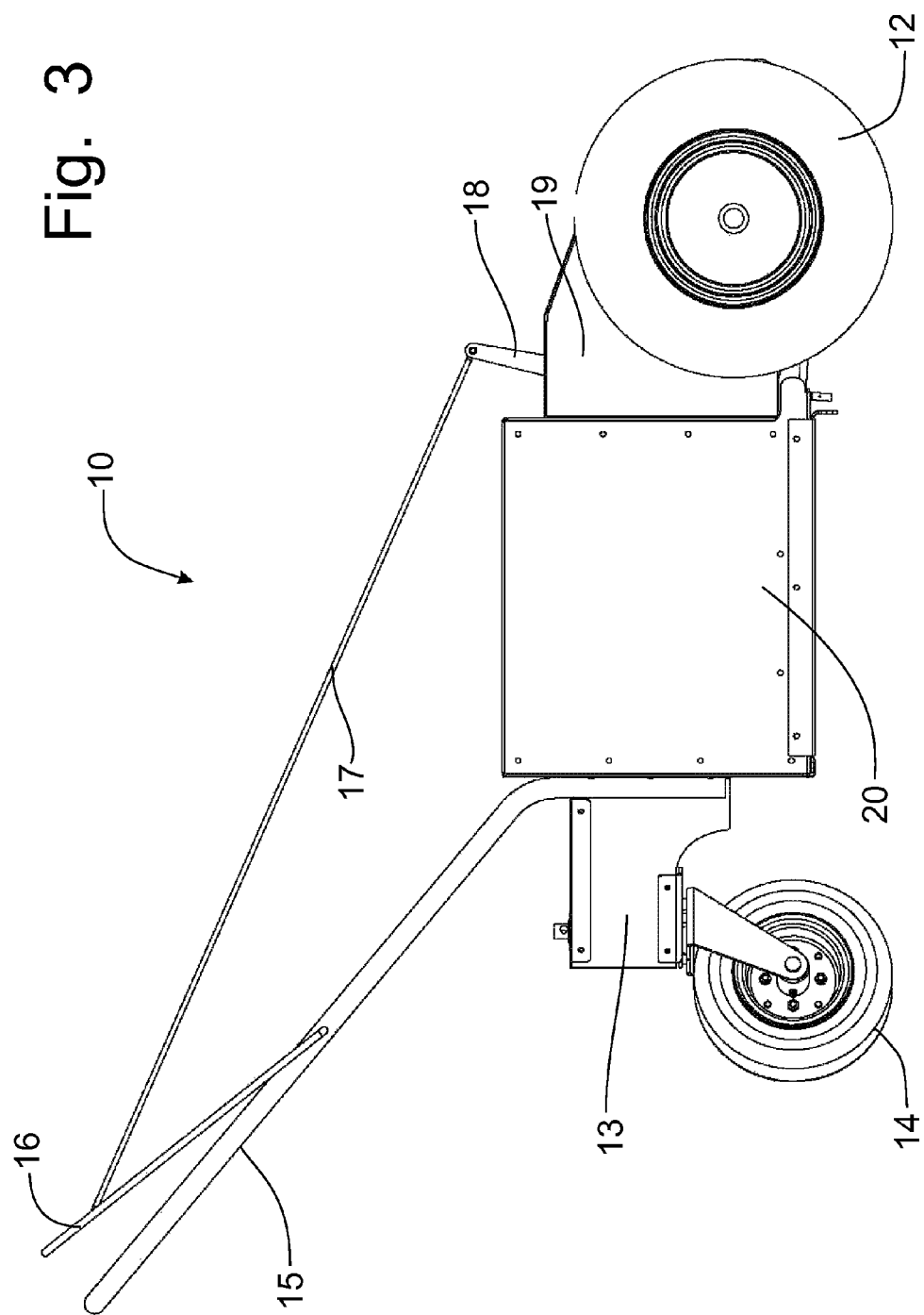
FIG. 3 is a side elevational view of the compost spreading apparatus shown in FIG. 1.
Figure 4:
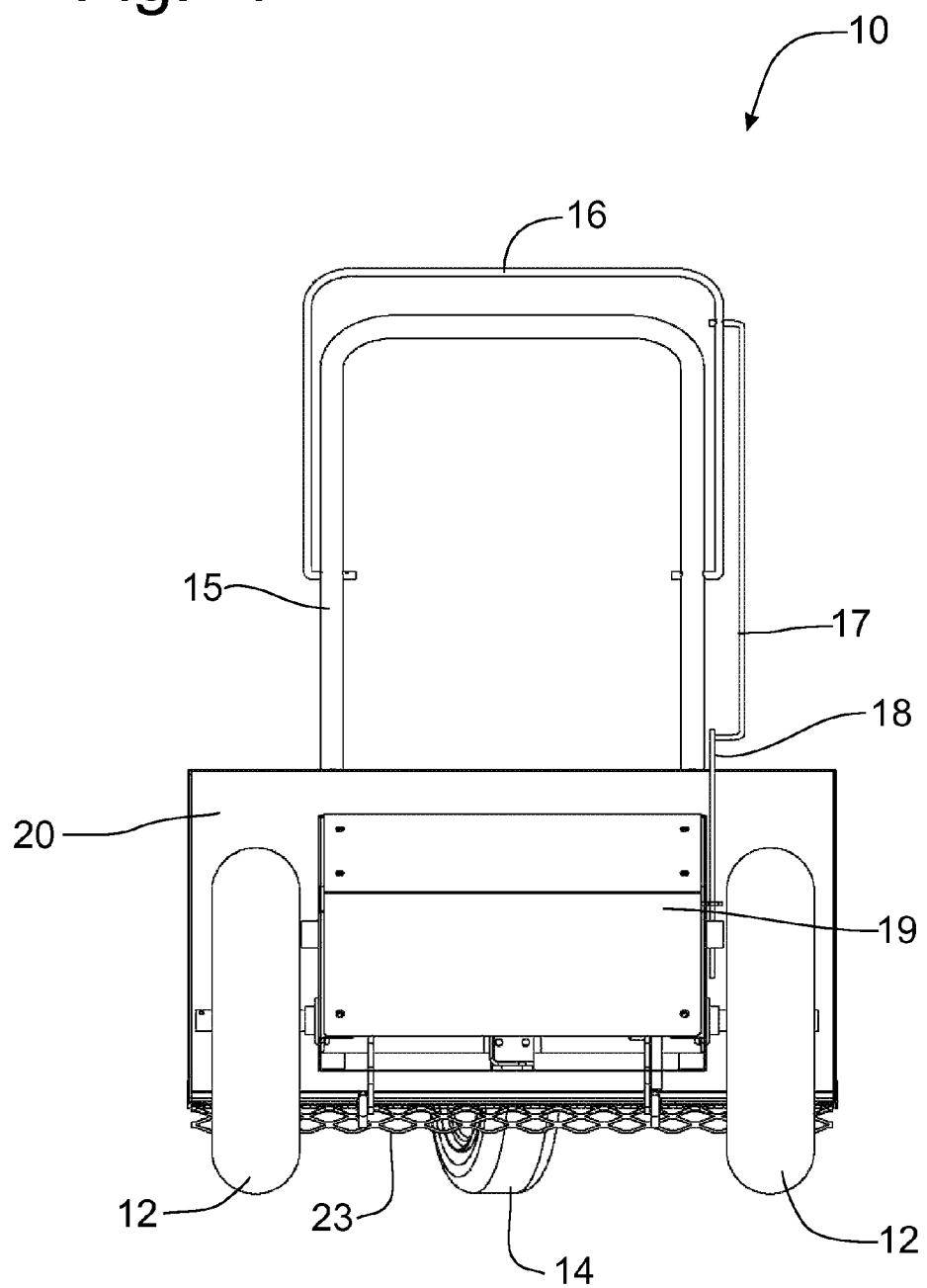
FIG. 4 is a front elevational view of the compost spreading apparatus shown in FIG. 1.
Figure 5:
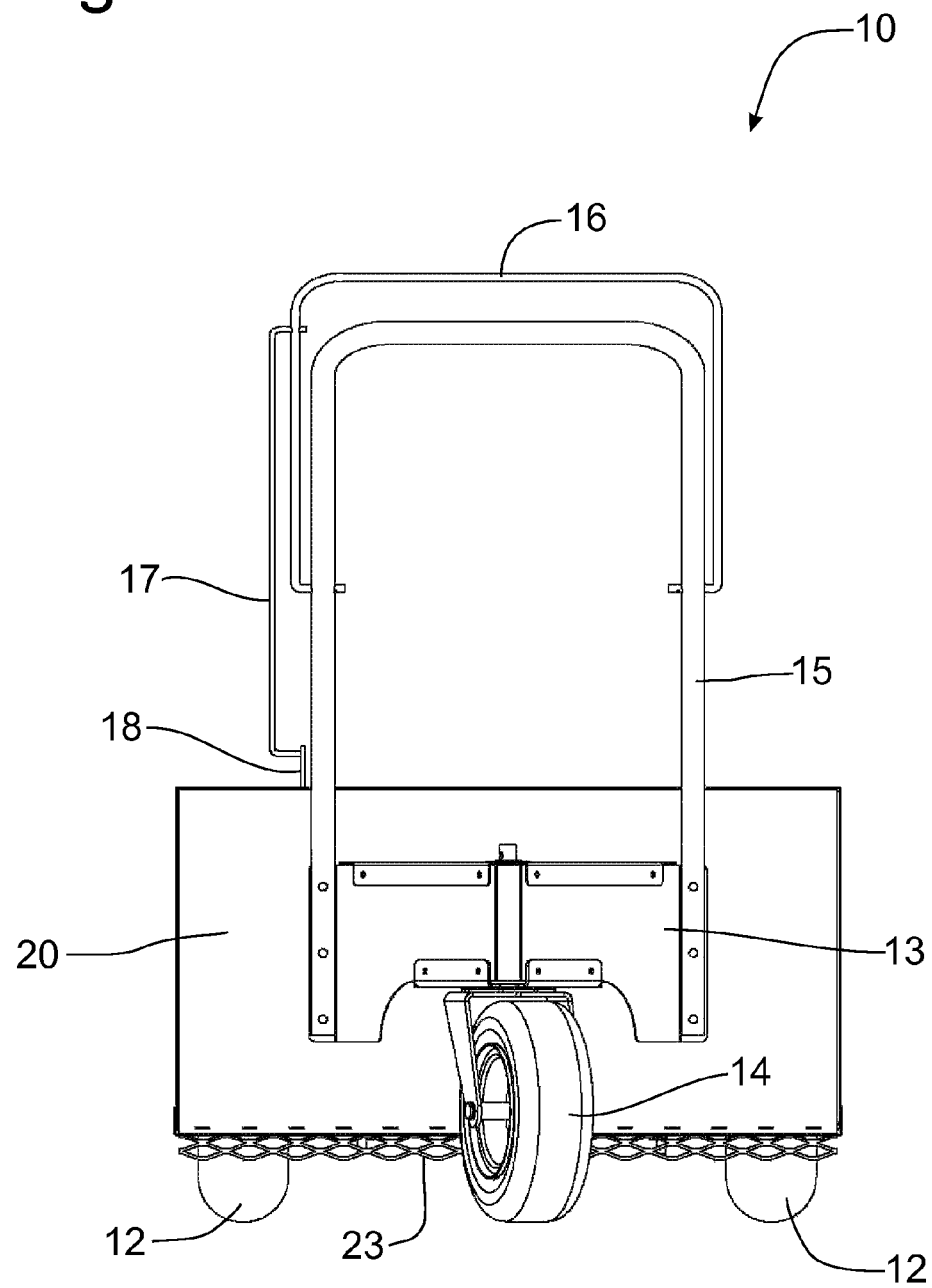
FIG. 5 is a rear elevational view of the compost spreading apparatus shown in FIG. 1.
Figure 6:
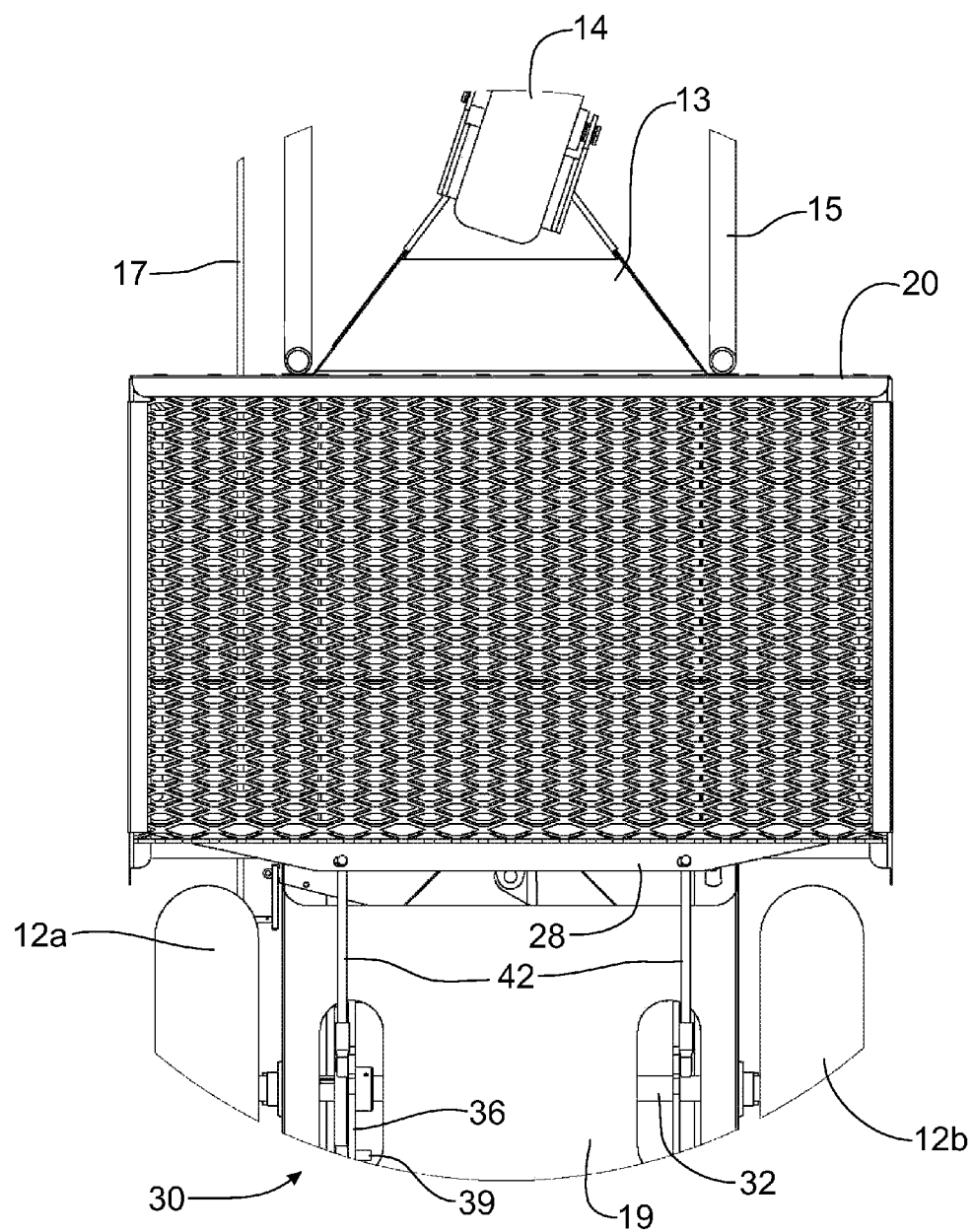
FIG. 6 is an enlarged partial bottom plan view of the hopper and screen distribution mechanism corresponding to the circle A-A in FIG. 2.
Figure 7:
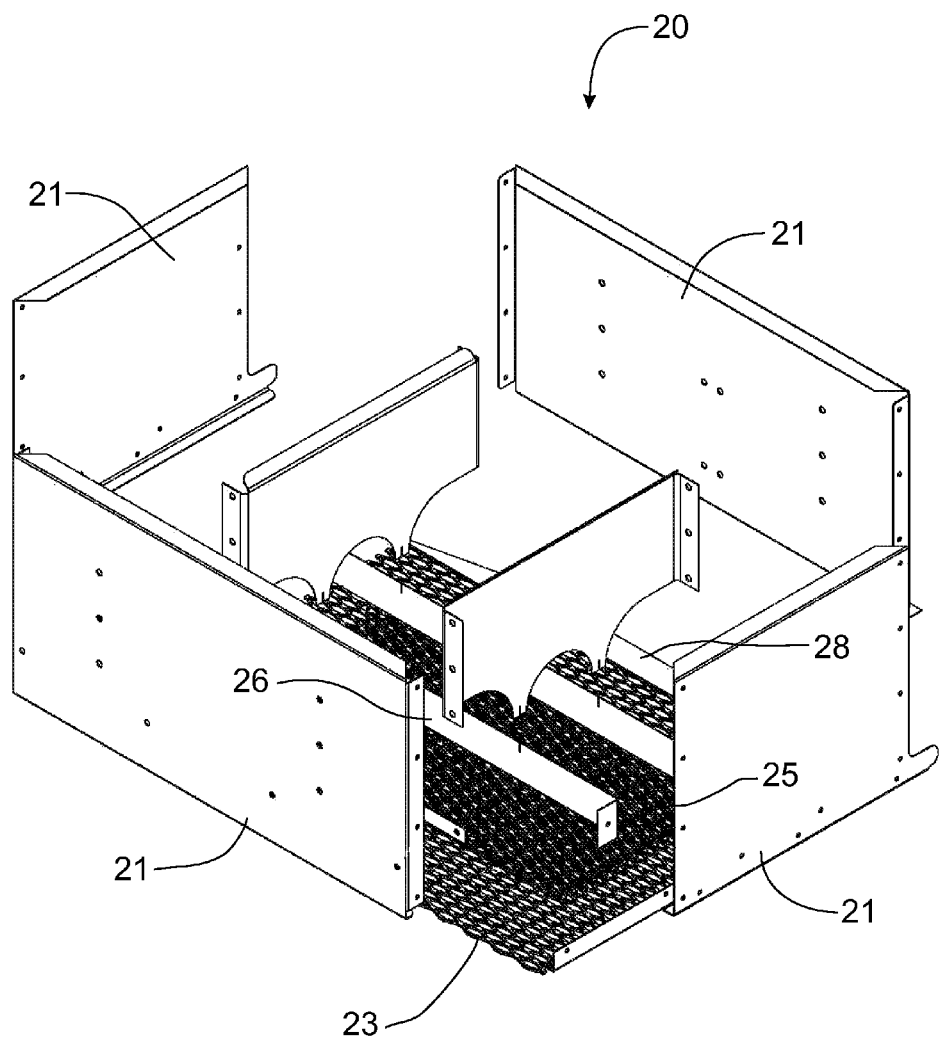
FIG. 7 is an exploded view of the hopper and dual screen distribution mechanism.

The downwardly extending arm of each of the rocker members 36 is coupled to a longitudinally extending drive arm 42 such that the drive arms 42 are moved forwardly and rearwardly in conjunction with the corresponding movement of the rocker members 36 caused by the cam follower 39 moving along the machined groove in the rotating cam member 40. As is best seen in FIG. 2, the downwardly extending arms of the rocker members 36 project through openings in the bottom surface of the drive housing 19 so that the drive arms 42 can extend rearwardly thereof into engagement with a connecting rib 28 on the front of the movable screen 25. Thus, when the rocker members 36 move forwardly and rearwardly in conjunction with the cam follower 39 moving on the rotating cam member 40, the drive arms 42 reciprocate the movable screen 25 longitudinally over the stationary screen 23.

Referring again to the exploded view of the drive mechanism 30 in FIG. 8, and to FIGS. 1 and 3-6, the activation lever 16 includes a connecting link 17 that couples the activation lever 16 to a shift lever 18 pivotally mounted on the drive housing 19 to shift the drive mechanism 30 between operative and inoperative configurations. The shift lever 18 is connected to an L-shaped transfer quadrant 43 pivotally supported on a pivot bracket 44 and having a shift driver 45 connected at the forward arm thereof. The shift driver 45 is positioned within the confines of the shift collar 37 mounted on the transverse rod 38 extending between the rocker members 36. When the activation lever 16 is depressed onto the push handle assembly 15, the connecting link 17 pulls on the shift lever 18, which in turn pivotally rotates the transfer quadrant 43 to move the shift driver 45 laterally and, thereby, move the shift collar 37 laterally. The movement of the shift collar 37 causes a corresponding lateral movement of the rocker weld assembly 35 to engage the cam follower 39 with the machined groove in the cam member 40 to effect the reciprocating movement of the movable screen 25. Conversely, moving the activation lever 16 upwardly away from the push handle assembly 15 results in a lateral movement of the shift collar 37 to disengage the cam follower 39 from the cam member 40, thereby disengaging the drive mechanism 30 into an inoperative configuration.

In operation, the operator would fill the hopper 20 with a supply of compost and push the apparatus 10 into position where a topdressing of compost on the ground is desired. By grasping the handle 15, the operator can provide the power to move the apparatus 10 over the surface of the ground and to change the direction of travel of the apparatus 10. Once the apparatus is positioned at the desired location, the operator pulls down the activation lever 16 to shift the rocker weld assembly 35 laterally so that the cam follower 39 mounted on the rocker member 36 can engage the cam member 40. If the cam member 40 is oriented in a manner that would block the shifting of the rocker weld assembly 35, the operator will need to move the apparatus 10 slightly to re-orient the cam member 40, which is fixed to and rotates with the drive axle 32 which is secured to the drive wheel 12a.

With the drive mechanism 30 engaged, the operator pushes the handle 15, and thus the apparatus 10, over the surface of the ground over which the topdressing of compost is desired. When the apparatus 10 becomes positioned over a portion of the ground where the topdressing of compost is not desired, the activation lever 16 is raised to disengage the drive mechanism 30 by shifting the rocker weld assembly 35 laterally such that the cam follower 39 is spaced from the cam member 40. With the drive mechanism 30 engaged, the rotation of the drive wheel 12a turns the cam member 40 whereby the machined groove in the cam member 40 provides a surface over which the cam follower 39 moves to oscillate the rocker members 36 longitudinally. The longitudinal movement of the rocker members 36 pushes and pulls on the drive arms 42 connected to the movable screen 25 causing the longitudinal reciprocal movement of the movable screen 25 over the top of the stationary screen 23. The reciprocal movement of the upper screen 25 creates a sifting action on the compost material and reduces particle size of the compost material until the compost falls through the screens 23, 25 and onto the surface of the ground.

Furthermore, the reciprocating motion of the drive mechanism 30 and the movable screen 25 creates sufficient vibration that, along with the vertically oriented sides 21 of the hopper 20, prevents the compost material from bridging within the hopper 20. Preferably, the stationary and movable screens 23, 25 are formed from expanded metal formation techniques; however, the screens could also be formed of sheet metal with pre-punched holes, or plastic screens, which would still allow the passage of compost particles through the screen members 23, 25 when the reciprocating shuttling of the movable screen 25 is accomplished. The weight of the apparatus 10 with the hopper 20 completely loaded with compost material is a significant factor in the design and manufacture of the apparatus 10 as the total weight must not be too great to enable the operator to manually move the apparatus 10 over the surface of the ground.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention.

In the way of an example, one skilled in the art would recognize that the removal of the handle assembly 15 and substituting therefor a hitch mechanism (not shown) would enable the compost spreading apparatus 10 to be connected to a prime mover, such as a lawn tractor or ATV, and operated as a pull-type implement.

As a further example, the apparatus 10, including the stationary and movable screens 23, 25 can be utilized with a supplemental spreading device (not shown) wherein the apparatus 10 would break up and dispense compost through the screens 23, 25 onto the spreading device that would then discharge the dispensed compost over the ground in a swath that can be substantially wider than the apparatus 10. The drive for the movable screen 25 and for the spreading device can be provided as a ground drive in the substantially the same manner as described above.

Having thus described the invention, what is claimed is:

1. A topdresser for spreading particulate material over the surface of the ground comprising:
    a wheeled frame adapted for movement over the ground, said frame including an axle having mounted thereon a pair of ground engaging wheels to support said frame above the ground, said pair of ground engaging wheels including a drive wheel;
    a hopper supported on said frame for carrying a supply of particulate material over the ground;
    a reciprocating screen mechanism supported on said frame below the hopper to engage particulate material within the hopper for discharge to the ground; and
    a drive mechanism for powering the reciprocation of the screen mechanism, said drive wheel being operably coupled to said drive mechanism to power the reciprocation of said scree mechanism when said frame is moved over the ground.

2. The topdresser of claim 1 wherein said reciprocating screen mechanism comprises:
    a lower screen supported from said frame in a fixed orientation relative to said hopper; and
    a movable upper screen connected to said drive mechanism to move in a fore-and-aft reciprocating motion relative to said lower screen.

3. The topdresser of claim 2 wherein the other of said ground engaging wheels is a freely rotatable wheel that is rotatably mounted on said axle to allow said freely rotatable wheel to rotate independently of said drive wheel.

4. The topdresser of claim 3 wherein said drive mechanism includes a lobed cam member that is rotatable with said drive wheel, said cam member engaging a rocker mechanism that causes reciprocation of said upper screen as said cam member rotates with said drive wheel.

5. The topdresser of claim 4 wherein said rocker mechanism includes a pair of laterally spaced rocker members interconnected by a shift apparatus, one of said rocker members including a cam follower engaged with said cam member to cause said rocker members to rock forward and backward in response to said cam follower being engaged with said cam member when rotating.

6. The topdresser of claim 5 wherein said shift apparatus includes a shift collar mounted on a transverse shaft interconnecting said rocker members, said shift collar being connected to a manually operable linkage that is selectively movable to laterally shift said cam follower into and out of engagement with said cam member.

7. The topdresser of claim 6 wherein said hopper is formed with guide members that secure said upper screen at a bottom portion of said hopper for fore-and-aft reciprocation relative to the hopper.

8. The topdresser of claim 7 wherein said axle and said ground engaging wheels are positioned at a forward portion of said frame, said frame further including a caster wheel supporting said frame above the ground and being located at a rearward portion of said frame.

9. A manually operable, push-type topdresser for applying compost to the ground, comprising:
    a wheeled frame adapted for movement over the ground;
    a hopper supported on said frame for carrying a supply of compost over the ground;
    a pair of screens supported on said frame below the hopper to engage compost within the hopper for discharge to the ground and including a lower screen mounted in a stationary manner with respect to said hopper, and an upper screen mounted for reciprocation relative to said hopper and to said lower screen to engage material within said hopper, said upper and lower screens operating to provide a sifting action on said compost to reduce said compost to a substantially uniform particle size before being discharged to the ground; and
    a ground drive mechanism for powering the reciprocation of the upper screen.

10. The topdresser of claim 9 wherein said frame includes an axle having mounted thereon a pair of ground engaging wheels to support said frame above the ground, said pair of ground engaging wheels including a drive wheel coupled to said drive mechanism to power the operation of said drive mechanism when said frame is moved over the ground.

11. The topdresser of claim 10 wherein the other of said ground engaging wheels is a freely rotatable wheel that is rotatably mounted on said axle to allow said freely rotatable wheel to rotate independently of said drive wheel.

12. The topdresser of claim 11 wherein said drive mechanism includes a lobed cam member that is rotatable with said drive wheel, said cam member engaging a rocker mechanism that causes reciprocation of said upper screen as said cam member rotates with said drive wheel.

13. The topdresser of claim 12 wherein said rocker mechanism includes a pair of laterally spaced rocker members interconnected by a shift apparatus, one of said rocker members including a cam follower engaged with said cam member to cause said rocker members to rock forward and backward in response to said cam follower being engaged with said cam member when rotating.

14. The topdresser of claim 13 wherein said shift apparatus includes a shift collar mounted on a transverse shaft interconnecting said rocker members, said shift collar being connected to a manually operable linkage that is selectively movable to laterally shift said cam follower into and out of engagement with said cam member.

15. A manually operable, push-type topdresser for applying particulate material onto the surface of the ground, comprising:
    a wheeled frame adapted for movement over the ground, said wheeled frame including an axle having mounted thereon a pair of ground engaging wheels to support said frame above the ground, said pair of ground engaging wheels including a drive wheel;

a hopper supported on said frame for carrying a supply of particulate material over the ground;

a screen mechanism mounted at a bottom portion of said hopper to engage particulate material within the hopper for discharge to the surface of the ground, said screen mechanism including a pair of vertically spaced screen with at least one of said screens being mounted for reciprocation relative to said hopper; and a ground drive mechanism for powering the reciprocation of the upper screen, said drive mechanism being coupled to said drive wheel to power the reciprocation of said at least one screen when said frame is moved over the ground.

16. The topdresser of claim 15 wherein said screen mechanism includes a lower screen mounted in a stationary manner with respect to said hopper, and an upper screen mounted for reciprocation relative to said hopper and to said lower screen to engage material within said hopper, said upper and lower screens operating to provide a sifting action on said compost to reduce said compost to a substantially uniform particle size before being discharged to the ground.

17. The topdresser of claim 16 wherein said pair of ground engaging wheels also includes a freely rotatable wheel that is rotatably mounted on said axle to allow said freely rotatable wheel to rotate independently of said drive wheel.

18. The topdresser of claim 17 wherein said drive mechanism includes a lobed cam member that is rotatable with said drive wheel, said cam member engaging a rocker mechanism that causes reciprocation of said upper screen as said cam member rotates with said drive wheel, said rocker mechanism including a pair of laterally spaced rocker members interconnected by a shift apparatus, one of said rocker members including a cam follower engaged with said cam member to cause said rocker members to rock forward and backward in response to said cam follower being engaged with said cam member when rotating.

19. The topdresser of claim 18 wherein said shift apparatus includes a shift collar mounted on a transverse shaft interconnecting said rocker members, said shift collar being connected to a manually operable linkage that is selectively movable to laterally shift said cam follower into and out of engagement with said cam member.

\* \* \* \* \*